US012334113B2

(12) United States Patent
Agrawal et al.

(10) Patent No.: US 12,334,113 B2
(45) Date of Patent: Jun. 17, 2025

(54) SELECTIVE RECORDING OF MEETING CONTENT

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/933,179

(22) Filed: Sep. 19, 2022

(65) Prior Publication Data

US 2024/0096374 A1  Mar. 21, 2024

(51) Int. Cl.
*G11B 27/031* (2006.01)
(52) U.S. Cl.
CPC ................... *G11B 27/031* (2013.01)
(58) Field of Classification Search
CPC .................................................. G11B 27/031
See application file for complete search history.

(56) References Cited

U.S. PATENT DOCUMENTS

| 8,707,186 | B2 | 4/2014 | Kashi | |
|---|---|---|---|---|
| 10,701,482 | B2 | 6/2020 | Sinkov | |
| 11,532,333 | B1 * | 12/2022 | Li | G10L 25/57 |
| 2011/0206198 | A1 * | 8/2011 | Freedman | H04M 3/42221 |
| | | | | 379/265.03 |
| 2015/0026603 | A1 | 1/2015 | Tripathi | |
| 2022/0132202 | A1 * | 4/2022 | Obaidi | H04N 23/661 |
| 2022/0353211 | A1 * | 11/2022 | White | H04L 51/02 |
| 2023/0025009 | A1 * | 1/2023 | Shah | H04N 5/772 |

FOREIGN PATENT DOCUMENTS

| KR | 102376874 B1 | 3/2022 |
|---|---|---|
| RU | 2488227 C2 | 7/2013 |
| WO | 2017177791 A1 | 10/2017 |

OTHER PUBLICATIONS

Disclosed Anonymously, "A Method of Clearing the Irrelevant Content during Recording," IP.com, IP.com No. IPCOM000267398D, IP.com Publication Date: Oct. 23, 2021, 3 pages.
Fortune Business Insights, "Speech and Voice Recognition Market to Rise Exponentially at a CAGR of 19.8%, Cloud-based Segment to Emerge Dominant, Says Fortune Business Insights," PR Newswire, Sep. 12, 2019. https://www.prnewswire.com/news-releases/speech-and-voice-recognition-market-to-rise-exponentially-at-a-cagr-of-19-8-cloud-based-segment-to-emerge-dominant-says-fortune-business-insights-300916868.html, 8 pages.
IBM, "The Future of Video with Watson," IBM.com, Accessed: Jun. 8, 2022, https://video.ibm.com/, 5 pages.

* cited by examiner

*Primary Examiner* — Mishawn N. Hunter
(74) *Attorney, Agent, or Firm* — Michael O'Keefe

(57) ABSTRACT

According to one embodiment, a method, computer system, and computer program product for selectively recording meetings is provided. The embodiment may include initiating a digital meeting. The embodiment may also include determining two or more rule sets, including one or more local rule sets, for selectively recording the digital meeting, wherein each rule set includes one or more rules. The embodiment may further include recording one or more recordings of the digital meeting according to each local rule set.

17 Claims, 2 Drawing Sheets

SELECTIVE RECORDING OF MEETING CONTENT

BACKGROUND

The present invention relates generally to the field of computing, and more particularly to web conferencing, or alternatively to web conference recording.

Web conferencing is a field of telecommunications that facilitates video, audio, and text-based meetings and discussions. Video might include video of a user, video captured by a user, or a video feed of a user's screen. A meeting may be held among two or more users, who may discuss business or personal matters. A meeting may have a host, presenter, or leader or any number of participants on equal footing. Any user might wish to record some or all of the meeting, creating a practical record.

SUMMARY

According to one embodiment, a method, computer system, and computer program product for selectively recording meetings is provided. The embodiment may include initiating a digital meeting. The embodiment may also include determining two or more rule sets, including one or more local rule sets, for selectively recording the digital meeting, wherein each rule set includes one or more rules. The embodiment may further include recording one or more recordings of the digital meeting according to each local rule set.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
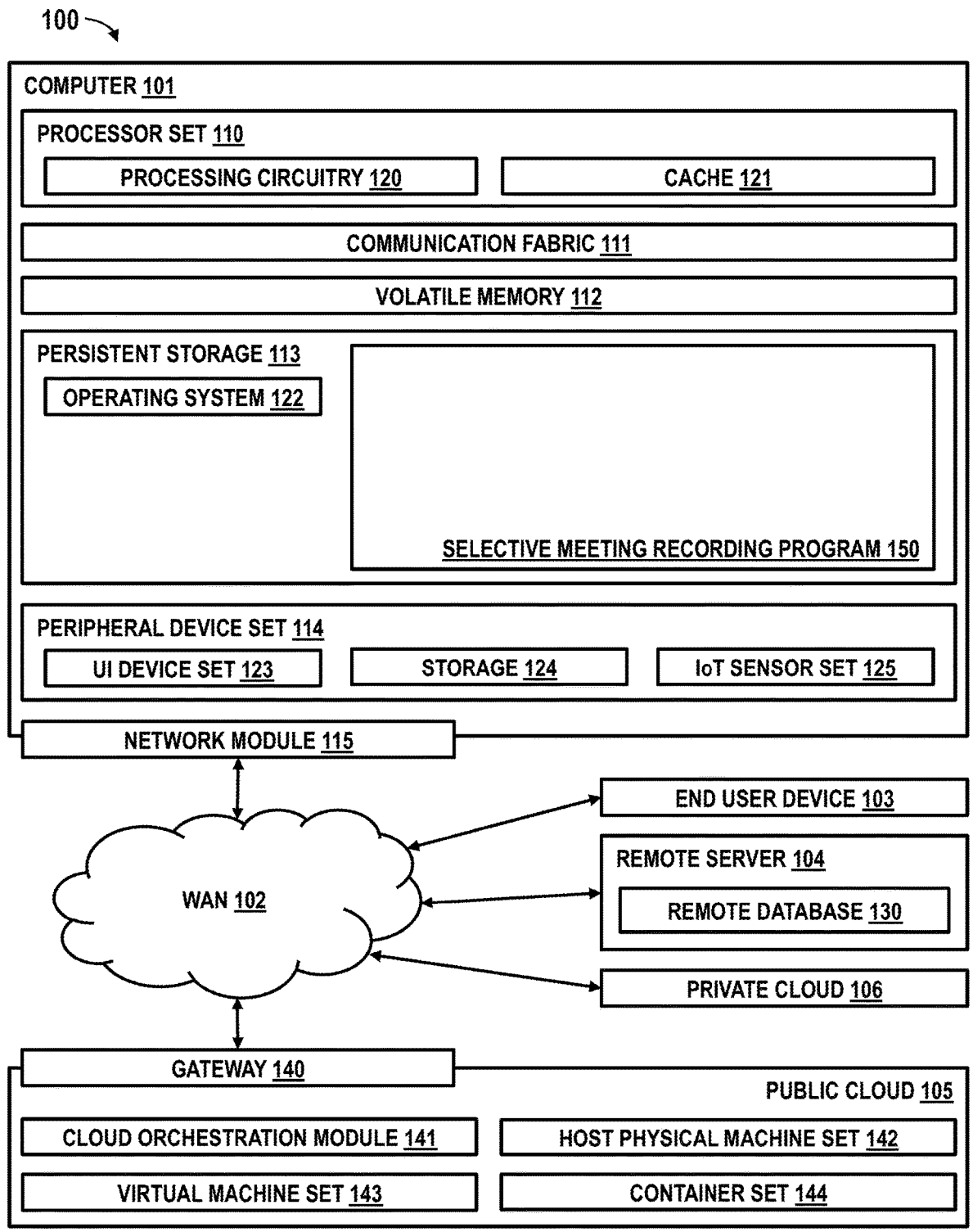
FIG. 1 illustrates an exemplary networked computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, selectively record meeting content. Therefore, the present embodiment has the capacity to improve the technical field of web conferencing by providing a process to selectively record meeting content according to one or more sets of rules.

As previously described, web conferencing is a field of telecommunications that facilitates video, audio, and text-based meetings and discussions. A meeting may be held among two or more users, who may discuss business or personal matters. A meeting may have a host, presenter, or leader or any number of participants on equal footing. Any user might wish to record some or all of the meeting, creating a record that may be useful as a business record, legal record, or personal memory, among other things.

Users may wish to record only a portion of a meeting for these purposes. Recording a whole meeting may take up too much drive space, or may pose security or privacy risks, or scare users who do not want to be recorded. Traditionally, users could decide to record a meeting or not, but do not have granular control over which content to record, how, and when. Even if users can engage in such granular control, they may not be able to continuously control a recording while also participating in a meeting, and different users may have conflicting policies. As such, it may be advantageous to record a meeting selectively, following one or more sets of algorithmic rules.

According to at least one embodiment, at the initiation of a web conference, video chat, or similar digital meeting, one or more rules may be established by which to selectively record the contents of that meeting. The user-selected or algorithmically generated rules may then be used to record selective portions of the content of the meeting, or selectively modify the content of an existing meeting recording according to the rules.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as selective meeting recording program 150. In addition to selective meeting recording program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and selective meeting recording program 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in selective meeting recording program 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in selective meeting recording program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi® signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi® network. The WAN 102 and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Selective meeting recording program 150 may be a set of computer instructions that carry out the inventive steps. The selective meeting recording program 150 may initiate a digital meeting. The selective meeting recording program 150 may then determine rules by which to selectively record portions of that meeting, and then selectively record the meeting according to the rules. Notwithstanding depiction in computer 101, selective meeting recording program 150 may be stored in and/or executed by, individually or in any combination, end user device 103, remote server 104, public cloud 105, and private cloud 106. The method for selectively recording meeting content is explained in further detail below with respect to FIG. 2.

Figure 2:
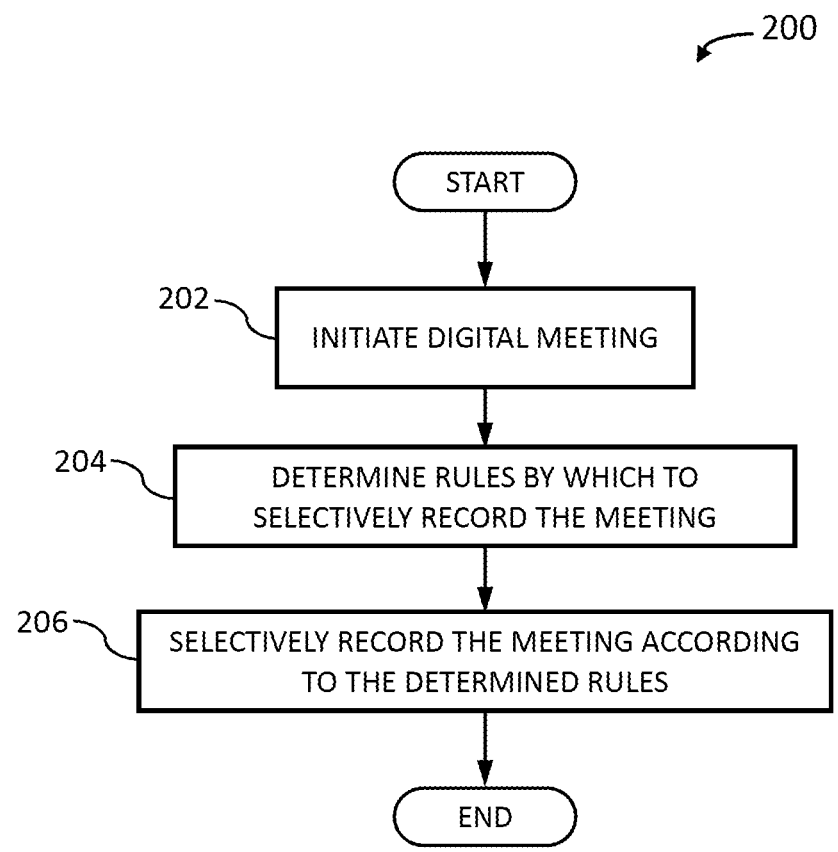
FIG. 2 illustrates an operational flowchart for a process for selectively recording meeting content according to at least one embodiment.

Referring now to FIG. 2, an operational flowchart illustrating a process for selectively recording meeting content 200 is depicted according to at least one embodiment. At 202, the selective meeting recording program 150 initiates a digital meeting. A digital meeting may include, for example, a web conference or video chat. Initiating a meeting may include determining participants in the meeting, alerting a user through a user device, identifying an agenda or agenda items for the meeting, and determining other meeting data.

In at least one embodiment, determining participants in the meeting may include determining one or more of a meeting scheduler, host, leader, or presenter. Determining participants may also include participants who may attend and interact on the meeting, or participants who are members of a viewing or listening audience but lack permission to speak or show video on the meeting. A meeting may be restricted so that only predetermined participants have access, or may accept arbitrary participants, such as participants with a link to access a meeting. Participants may further include a caller and a call recipient.

In another embodiment, alerting a user may include providing a meeting reminder, ringing a ringtone on a user device, or messaging an access link to a user device. A target device may include a computer such as computer 101, or a device communicatively coupled with a computer 101, such as a connected speaker or headset.

In yet another embodiment, identifying an agenda or agenda items may include identifying a pre-written agenda provided by a meeting scheduler, host, leader, presenter, caller, or other participant. Alternatively, identifying an agenda may include, for example, generating an agenda by a collaborative process, by analysis of a presentation attached to a meeting invite, by live analysis of the content of the call, or by a process of artificial intelligence, including use of a neural network. Identifying agenda items may include parsing or semantic analysis of an agenda.

In at least one embodiment, determining other meeting data may include, for example, determining other data regarding participants; devices; company policies including security policies, data retention policies, or storage space policies; data about past meetings; network data; historical data regarding past meetings; and any other data that may be useful in machine learning and artificial intelligence. A rule designed to filter improper content from a recording may be considered to "sanitize" the recording from improper content.

In a further embodiment, initiating a meeting may include determining one or more predefined rules as described at 204. For example, a meeting leader may predefine a rule, while scheduling a call, that the meeting audio should only be recorded from five minutes after the start time to sixty minutes after the start time, and video of slides should be recorded but not video of participants.

Then, at 204, the selective meeting recording program 150 determines one or more rule sets which each include one or more rules by which to selectively record a digital meeting. Rules may be predetermined, determined during a call, or, alternatively, determined after a call in order to selectively modify a recording. Rules may be set or input manually by a user or users, or may be determined by an algorithmic process, including by an artificial intelligence process.

In at least one embodiment, rules may be predetermined. Predetermined rules may be set at the time of scheduling a meeting, at the time a participant accepts a meeting invitation, immediately before a call, or at any other time before recording takes place. For example, each participant may, upon accepting a meeting invitation, manually select a rule set corresponding to that participant. Alternatively, predetermined rules may be set based on agenda items at the moment a user hits a record button, but before the recording actually begins.

In another embodiment, rules may be determined during a meeting. Rules determined during a meeting may include rules determined by participants during a meeting or rules generated dynamically by an algorithmic process. For example, Annie may decide that she is about to say something sensitive, and, without muting her voice on a call, set a general rule that turns off call recording for all users while Mary is speaking until Mary changes the rule. Alternatively, Mary may set a rule that turns off recording from Mary's device's microphones until Mary changes the rule.

In an alternative embodiment, rules may be determined after a meeting in order to selectively modify a recording made during the meeting. For example, an employee responsible for security may apply rules relating to a security policy to a full recording of a meeting. Such a rule may, for example, filter out any passwords or other sensitive security information from a recording.

In yet another embodiment, rules may include rules determined before, during, and after a meeting. For example, Bob may set rules when Bob schedules the meeting, additional rules may be set algorithmically while a meeting is in progress, and additional rules may be set afterward for modifying the recording made selectively. Additionally, rules determined before a meeting may be modified during a meeting, for example by a process of artificial intelligence as it collects new information.

In at least one embodiment, rules may be determined based on manual input from one or more users. For example, the selective meeting recording program 150 may provide Charlie with user interface options that allow Charlie to select a rule that says that video of him should only be recorded if a gesture would help clarify his meaning, or that recordings saved for Charlie should be filtered for obscenity. Alternatively, a general rule may be set by a company that all meeting recordings in the company should follow a security policy. Such a general rule may be applied to all meetings across the company.

In another embodiment, rules may be determined according to an algorithmic process. An algorithmic process may include, for example, a standard company-wide algorithm for determining rules, an algorithm that develops a rule to filter out audio that is relatively loud compared to a determined baseline volume, an algorithm that copies rules from similar previous meetings, or a process of artificial intelligence for determining rules.

Artificial intelligence may include machine learning, deep learning, or use of a neural network. Neural networks may, for example, include convolutional neural networks or long short-term memory. For example, a neural network may determine new rules based on rules used in similar previous meetings. Alternatively, a neural network using long short-term memory may determine a rule for recording text-based descriptions of relevant gestures or body language initially captured on video.

In at least one embodiment, rules may be set by users to align with personal preferences. For example, if a user does not like obscenities, a rule may filter out obscenities. Alternatively, if a user has very limited time, a rule may filter out unnecessary silence and excess verbiage (such as "umm") from a recording. Rules may alternatively be set for purposes such as security, data retention, privacy, or storage space. For example, a rule may enforce a company's security or data retention policies. Alternatively, a rule may determine that recording should filter out video and unnecessary silence and record text-based descriptions of relevant gestures or body language initially captured on video. Alternatively, a rule may determine that a given piece of meeting content should be recorded if it is considered sufficiently important according to an analysis performed by artificial intelligence.

In a further embodiment, the selective meeting recording program 150 may determine one or more rule sets, each including one or more rules. Rule sets may include local rule sets and general rule sets. For example, local rule sets may include one rule set for each participant on a call, for each participant that requests a recording before a meeting begins, for each department participating in a call, or for each of several security levels. Alternatively, general rule sets may include, for example, a global rule set that applies to all recordings and overrides conflicting local rules, or a default rule set whose rules are overridden by conflicting local rules. Each local rule set may correspond to one recording recorded at 206. A rule set may include information about what type of rule set it is, who the rule set is for, or an expected type of recording generated by the rule set.

In at least one embodiment, a user who is not able to attend the call may request a recording or provide a rule set for generating a recording. Furthermore, a user may set more than one rule set or request more than one recording.

Then, at 206, the selective meeting recording program 150 selectively records one or more recordings of portions of the digital meeting according to the rules. Recording may include recording audio, video, slides, text-based chat, participant history, or any other aspect of the meeting, in the same format in which it originally occurs or a different format. A recording may be requested by one or more users or participants.

In at least one embodiment, one recording may be generated for each local rule set. Alternatively, a recording may be generated for each participant, user, or department who requests a recording. A user may, request more than one recording. For example, a user may request one recording of only audio and another recording of both audio and video. As an alternate example, a department head may request five recordings for five employees in her department who are not able to attend the meeting. A user may request a recording by setting a rule set by which the recording is to be generated.

In another embodiment, recording may be performed based on the rules as interpreted algorithmically, including by a process of artificial intelligence. For example, if a rule states that video of users should only be recorded if the video is relevant to meaning of spoken audio, a neural network using long short-term memory may determine the semantic importance of gestures or body language captured on video.

In a further embodiment, recording may include translating recordings to a different format. For example, recording may involve recording text-based descriptions of relevant gestures initially captured on video. Alternatively, recording may translate the language of text-based chat during the meeting to a language that a particular user speaks. Translation may be performed by an algorithmic process, such as a process of artificial intelligence. Artificial intelligence may include use of machine learning, deep learning, or a neural network, including a convolutional neural network or long short-term memory.

In an alternative embodiment, recording may include modifying an existing recording of a call after the call takes place. Such a recording may use rules determined before, during, or after a call. The selective meeting recording program 150 may record a complete recording of the call, but then, for example, set the security of the recording so that only the selective meeting recording program 150 can access or modify the complete recording. As an alternate example, the selective meeting recording program 150 may record a complete or relatively complete recording of the call and store the complete recording on a server computer, such as remote server 104 or private cloud 106, to which only the selective meeting recording program 150 has access, and then generate multiple recordings according to different rule sets from the server computer after the call.

In a further embodiment, recording may include recording feedback about a meeting, or about recordings. Feedback may be used as historical data for machine learning. Feedback may be recorded during or after the meeting.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving a recording of a web conference between two or more participants, wherein the recording comprises an audio feed and a video feed;
   determining a user-specific rule set, wherein at least one rule within the user-specific rule set is determined by a neural network trained on historical meeting data of a user, and wherein a first rule in the user-specific rule set relates to unnecessary silence, a second rule in the user-specific rule set relates to excess verbiage in the audio feed, and a third rule in the user-specific rule set relates to showing a shared screen of a participant in the two or more participants relevant to audio spoken by the participant or another participant in the two or more participants;

modifying the audio feed and/or the video feed based on the user-specific rule set; and generating an updated recording based on the modified audio feed and/or the modified video feed.

2. The method of claim 1, wherein the two or more rule sets include two or more local rule sets.

3. The method of claim 1, wherein the generating includes translating meeting content from one format into a different format using long short-term memory.

4. The method of claim 1, wherein the one or more rules include a rule that filters topics from the recording according to a security policy.

5. The method of claim 1, wherein recording modifying consists of selectively modifying a digital meeting after the digital meeting is initially recorded.

6. The method of claim 1, wherein determining rules includes determining which content is to be recorded based on a determination that certain body language signifies increased importance.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a recording of a web conference between two or more participants, wherein the recording comprises an audio feed and a video feed;

determining a user-specific rule set, wherein at least one rule within the user-specific rule set is determined by a neural network trained on historical meeting data of a user, and wherein a first rule in the user-specific rule set relates to unnecessary silence, a second rule in the user-specific rule set relates to excess verbiage in the audio feed, and a third rule in the user-specific rule set relates to showing a shared screen of a participant in the two or more participants relevant to audio spoken by the participant or another participant in the two or more participants;

modifying the audio feed and/or the video feed based on the user-specific rule set; and generating an updated recording based on the modified audio feed and/or the modified video feed.

8. The computer system of claim 7, wherein the two or more rule sets include two or more local rule sets.

9. The computer system of claim 7, wherein the generating includes translating meeting content from one format into a different format using long short-term memory.

10. The computer system of claim 7, wherein the one or more rules include a rule filtering topics out from recording according to a security policy.

11. The computer system of claim 7, wherein recording modifying consists of selectively modifying a digital meeting after it is initially recorded.

12. The computer system of claim 7, wherein determining rules includes determining which content is to be recorded based on a determination that certain body language signifies increased importance.

13. A computer program product, the computer program product comprising:
one or more computer-readable tangible storage medium and program instructions stored on at least one of the one or more tangible storage medium, the program instructions executable by a processor capable of performing a method, the method comprising:

receiving a recording of a web conference between two or more participants, wherein the recording comprises an audio feed and a video feed;

determining a user-specific rule set, wherein at least one rule within the user-specific rule set is determined by a neural network trained on historical meeting data of a user, and wherein a first rule in the user-specific rule set relates to unnecessary silence, a second rule in the user-specific rule set relates to excess verbiage in the audio feed, and a third rule in the user-specific rule set relates to showing a shared screen of a participant in the two or more participants relevant to audio spoken by the participant or another participant in the two or more participants;

modifying the audio feed and/or the video feed based on the user-specific rule set; and generating an updated recording based on the modified audio feed and/or the modified video feed.

14. The computer program product of claim 13, wherein the two or more rule sets include two or more local rule sets.

15. The computer program product of claim 13, wherein the generating includes translating meeting content from one format into a different format using long short-term memory.

16. The computer program product of claim 13, wherein the one or more rules include a rule filtering topics out from recording according to a security policy.

17. The computer program product of claim 13, wherein modifying consists of selectively modifying a digital meeting after it is initially recorded.

* * * * *